(12) United States Patent
Chuang

(10) Patent No.: US 9,902,451 B1
(45) Date of Patent: Feb. 27, 2018

(54) CARRIER DEVICE FOR A BICYCLE

(71) Applicant: Louis Chuang, Taichung (TW)

(72) Inventor: Louis Chuang, Taichung (TW)

( * ) Notice: Subject to any disclaimer, the term of this patent is extended or adjusted under 35 U.S.C. 154(b) by 0 days.

(21) Appl. No.: 15/487,546

(22) Filed: Apr. 14, 2017

(30) Foreign Application Priority Data

Aug. 31, 2016 (TW) .............................. 105128052 A

(51) Int. Cl.
*B62J 11/00* (2006.01)
*B62J 9/00* (2006.01)

(52) U.S. Cl.
CPC ...................................... *B62J 9/001* (2013.01)

(58) Field of Classification Search
CPC ..... B62J 9/001; B62J 11/00; B62J 9/02; B62J 2099/0093; B62J 9/005
USPC ......................................................... 224/425
See application file for complete search history.

(56) References Cited

U.S. PATENT DOCUMENTS

| | | | | |
|---|---|---|---|---|
| 5,170,981 A | * | 12/1992 | Lin ......................... | B62J 11/00 224/414 |
| 5,217,116 A | * | 6/1993 | Ku ............................. | B62J 9/02 206/374 |
| 5,326,006 A | * | 7/1994 | Giard, Jr. ................. | B62J 11/00 215/387 |
| 5,590,801 A | * | 1/1997 | Cohen .................... | B65D 55/14 220/315 |
| 6,315,182 B1 | * | 11/2001 | Chen ........................ | A45F 5/00 224/271 |
| 6,837,407 B1 | * | 1/2005 | Towers .................... | B62J 9/005 220/840 |
| 8,496,144 B2 | * | 7/2013 | Son ......................... | B60R 11/02 224/276 |
| 8,757,413 B1 | * | 6/2014 | Kephart ................... | B62J 9/005 206/804 |
| 9,115,887 B2 | * | 8/2015 | Chuang ................. | F21V 33/008 |
| 2007/0000961 A1 | * | 1/2007 | Chung ..................... | B62J 11/00 224/425 |
| 2017/0057581 A1 | * | 3/2017 | Chuang ..................... | B62J 9/02 |

FOREIGN PATENT DOCUMENTS

TW  M245136 U  10/2004

* cited by examiner

*Primary Examiner* — Brian D Nash
(74) *Attorney, Agent, or Firm* — Alan D. Kamrath; Kamrath IP Lawfirm, P.A.

(57) ABSTRACT

A carrier device includes a frame and a connecting unit connected to the frame and having an engaging member. The engaging member includes a receiving groove, at least one elastic portion elastically and flexibly disposed in a bottom wall of the receiving groove, and an abutting shoulder disposed in the receiving groove and having at least one opening. An article receiving unit is detachably connected to the connecting unit and includes an accommodating member for receiving articles for a bicycle. The accommodating member includes a protruding portion releasably received in the receiving groove and having at least one first positioning portion and at least one second positioning portion. The elastic portion is engaged with the first or second positioning portion. A pressing portion on the accommodating member is passable through the opening to a position between the abutting shoulder and the bottom wall of the receiving groove.

10 Claims, 8 Drawing Sheets

CARRIER DEVICE FOR A BICYCLE

BACKGROUND OF THE INVENTION

The present invention relates to a carrier device and, more particularly, to a carrier device that can be mounted to a bicycle.

Taiwan Utility Model No. M245136 discloses a bicycle water bottle holder for receiving tools. The water bottle holder includes a base and a water bottle positioning member fixed on the base. The base includes a receiving unit for receiving tools without significantly increasing the volume of the base. The base is substantially of a flat, square shape and includes two end faces. The receiving unit is formed in one of the end faces and includes a plurality of first receiving grooves in the form of deep holes for receiving L-shaped hexagonal wrenches and a plurality of second receiving grooves. A horizontal end of each hexagonal wrench is exposed outside of the end face of the base. Two ribs protrude from two ends of a side of the base. Each second receiving groove in the form of a deep hole is defined in one of the two ribs. A bit and a screw driver shank are respectively received in the second receiving holes. Furthermore, positioning grooves are defined in two lateral edges of the end face of the base and cooperates a lid to cover the receiving unit formed in the base. The lid includes hooks and engaging blocks for coupling with the positioning grooves. The other side of the base opposite to the ribs includes a front heel and a rear heel. Each of the front heel and the rear heel has a notch. The front heel includes an upwardly inclining end facing the base. The rear heel is substantially L-shaped. The water bottle positioning member is a substantially C-shaped holding plate providing an elastic force for clamping a water bottle. A substantially U-shaped stopper portion is formed on a central bottom portion of the holding plate and is inserted into the notches of the front heel and the rear heel. A groove is defined in the upper side of the U-shaped stopper portion. Bolts extend through the stopper portion and the base. The bolt heads are received in the groove. An end of each bolt extending beyond the stopper portion is fixed to a downtube of a bicycle. The two ribs of the base abut the downtube. The rear heel abuts a bottom of the water bottle opposite to the mouth of the water bottle. The upwardly inclination portion of the front heel elastically abuts a surface of the water bottle.

The lid of the water bottle holder is located on an end of the base adjacent to the front heel. The water bottle is received in the water bottle positioning member. The front heel extends toward the mouth of the water bottle. Thus, the lid is located between the water bottle and the bicycle frame. However, the user cannot easily open the lid for retrieving the tools, leading to inconvenient use.

Thus, a need exists for a novel carrier device for a bicycle that mitigates and/or obviates the above disadvantages.

BRIEF SUMMARY OF THE INVENTION

The present invention solves the problem of inconvenience in opening the lid disposed between the water bottle and the bicycle frame for retrieving the tools in the base.

The present invention provides a carrier device for a bicycle. The carrier device includes a frame having a first body portion and a second body portion. The first body portion is connected to the second body portion and includes at least one through-hole extending therethrough. The at least one through-hole is adapted to be aligned with a water bottle screw hole of a bicycle to permit the frame to be coupled to the bicycle. A connecting unit is connected to the second body portion and includes an engaging member. The engaging member includes a receiving groove, at least one elastic portion, an abutting shoulder, and at least one opening. The at least one elastic portion is elastically and flexibly disposed in a bottom wall of the receiving groove and includes an engaging edge. The abutting shoulder is disposed in an end of the receiving groove opposite to the at least one elastic portion. The at least one opening is disposed in the abutting shoulder and is intercommunicated with the receiving groove. An article receiving unit is detachably connected to the connecting unit and includes an accommodating member. The accommodating member is adapted to receive articles for the bicycle and includes a protruding portion, at least one first positioning portion, at least one second positioning portion, and at least one pressing portion. The protruding portion is releasably received in the receiving groove. The at least one first positioning portion and the at least one second positioning portion are disposed on the protruding portion. The engaging edge of the at least one elastic portion is selectively engaged with the at least one first positioning portion or the at least one second positioning portion. The at least one pressing portion is disposed on a side of the protruding portion and is passable through the at least one opening to a position between the abutting shoulder and the bottom wall of the receiving groove. The carrier device is switchable between an engaged position and a disengaged position.

When the carrier device is in the engaged position, the protruding portion is received in the receiving groove, the engaging edge of the at least one elastic portion positions the at least one first positioning portion, and the at least one pressing portion is received in the receiving groove and is located between the abutting shoulder and the bottom wall of the receiving groove, avoiding detachment of the article receiving unit from the connecting unit.

When the carrier device is in the disengaged position, the engaging edge of the at least one elastic portion positions the at least one second positioning portion, the at least one pressing portion aligns with the at least one opening and is movable out of the receiving groove, and the protruding portion is movable out of the receiving groove, permitting detachment of the article receiving unit from the connecting unit.

Thus, when a user intends to retrieve the articles for the bicycle, the carrier device can be easily switched from the engaged position to the disengaged position to easily detach the article receiving unit from the connecting unit. Then, the user can easily retrieve the articles received in the accommodating member.

In an example, the accommodating member is rotatable about a rotating axis relative to the receiving groove and includes an accommodating portion adapted for receiving the articles for the bicycle. The protruding portion and the accommodating portion are disposed on two opposite ends of the accommodating member along the rotating axis. The protruding portion includes an end face located on an end of the protruding portion remote to the accommodation portion. The at least one first positioning portion and the at least one second positioning portion are disposed on the end face of the protruding portion. The at least one pressing portion is disposed on a peripheral edge of the protruding portion adjacent to the end face of the protruding portion.

In an example, the abutting shoulder is annularly disposed around the receiving groove. The at least one opening includes two openings disposed in the abutting shoulder and located in two sides of the receiving groove which are diametrically opposed relative to the rotating axis. The two openings are intercommunicated with the receiving groove. The at least one pressing portion includes two pressing portions. The two pressing portions are disposed on a periphery of the protruding portion, diametrically disposed relative to the rotating axis, and extend away from each other. The two pressing portions are passable through the two openings, respectively.

In an example, the at least one elastic portion includes two elastic portions extending toward two opposite sides of the receiving groove. The at least one first positioning portion includes two first positioning portions. The at least one second positioning portion includes two second positioning portions. The two first positioning portions and the two second positioning portions are alternatingly arranged in a circumferential direction about the rotating axis. Each of the two first positioning portion is spaced from each of the two second positioning portion by 90 degrees. The engaging edges of the two elastic portions selectively position the two first positioning portions or the two second positioning portions.

In an example, each engaging edge is in the form of a projection. Each of the two first positioning portions includes a positioning groove. Each of the two second positioning portions is in the form of a groove and having two inclined faces interconnected to each other and spaced from each other by an angle. When the carrier device is in the engaged position, the engaging edges of the two elastic portions extend into the positioning grooves. When the carrier device is in the disengaged position, the engaging edge of each of the two elastic portions extends into between the two inclined faces of one of the two second positioning portions.

In an example, the engaging member includes two receptacles defined in the bottom wall of the receiving groove, and the two elastic portions are elastically and flexibly received in the two receptacles, respectively.

In an example, the second body portion includes a second through-hole extending through two opposite ends of the second body portion. The connecting unit includes a connecting member received in the second through-hole. The engaging member includes a connecting portion. The receiving groove and the connecting portion are respectively located on two opposite ends of the engaging member. The connecting portion is received in the second through-hole and is connected to the connecting member.

In an example, the frame includes a shoulder disposed on an inner periphery of the second through-hole. The connecting member includes an abutting portion. The connecting unit further includes a washer mounted between the shoulder and the abutting portion.

In an example, the article receiving unit further includes a cover, a pulling member, and a coupling member. The cover is pivotably connected to the accommodating member. The cover and the accommodating member together define an accommodation space adapted to receive the articles for the bicycle. The pulling member is pivotably connected to the cover. The coupling member is pivotably connected to the pulling member. The coupling member is releasably coupled with the accommodating member. The cover is pivotable relative to the accommodating member to open the accommodation space.

In an example, the frame includes at least one first rib, at least one second rib, and an extension. The at least one first rib is interconnected between the first body portion and the extension. The at least one second rib is interconnected between the first body portion and the extension. The first body portion, the second body portion, the at least one first rib, the at least one second rib, and the extension together define a receiving space A adapted for receiving a water bottle.

The present invention will become clearer in light of the following detailed description of illustrative embodiments of this invention described in connection with the drawings.

DETAILED DESCRIPTION OF THE INVENTION

Figure 1:
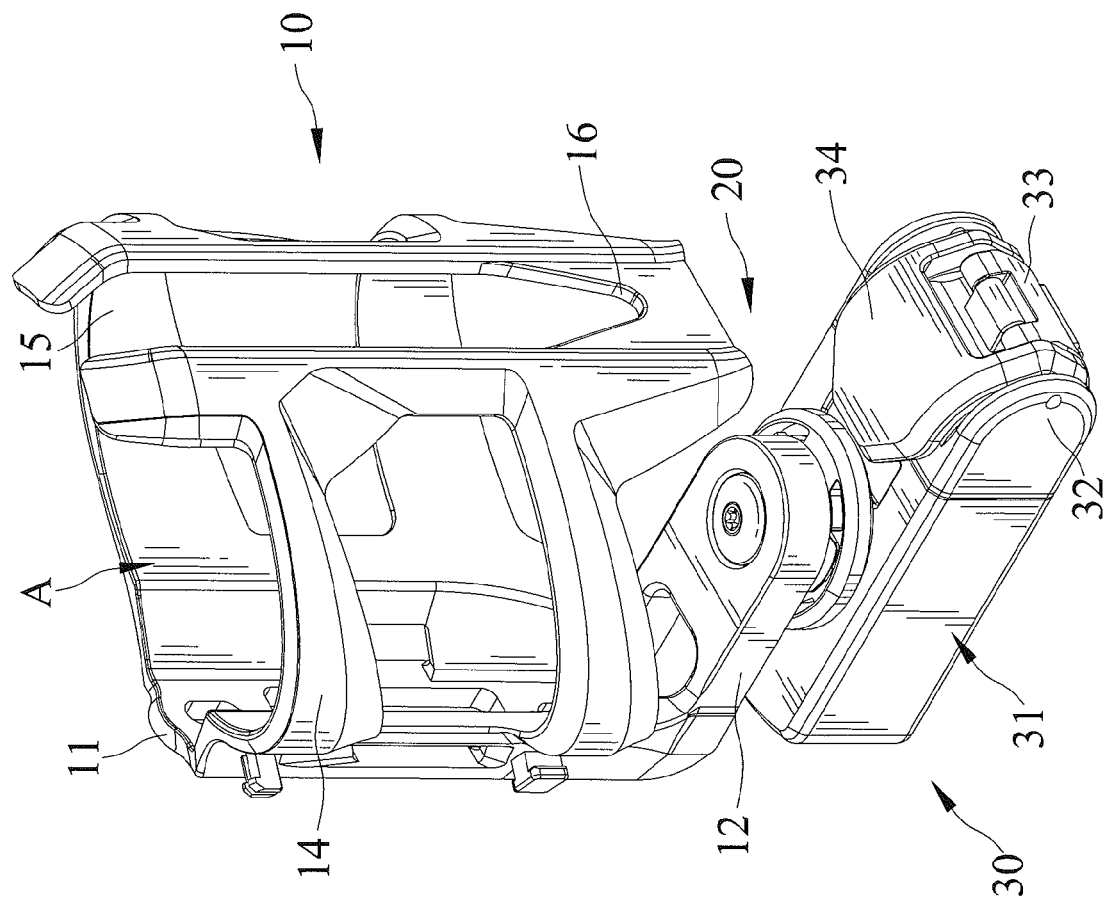
FIG. 1 is a perspective view of a carrier device for a bicycle of an embodiment according to the present invention.
Figure 2:
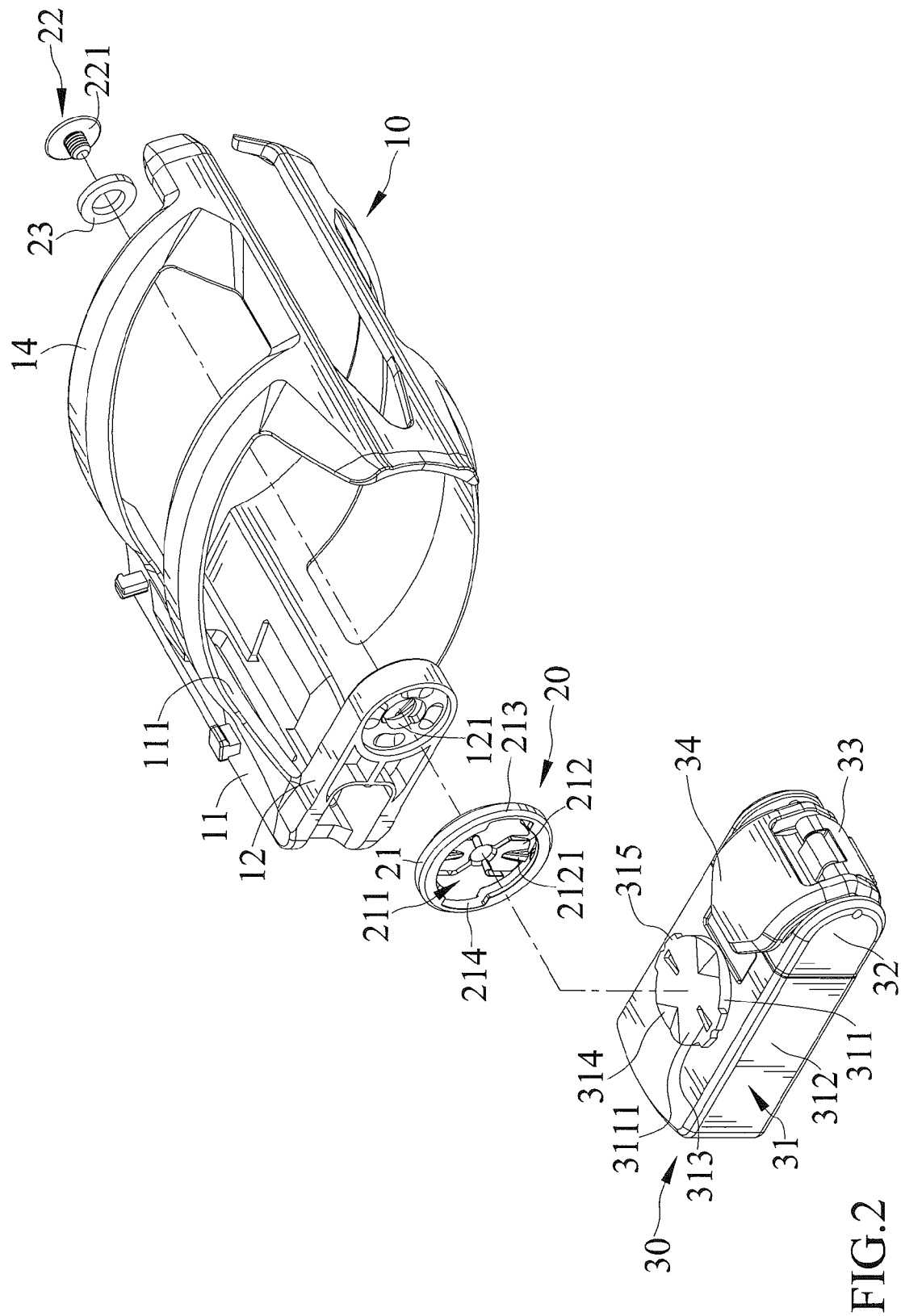
FIG. 2 is an exploded, perspective view of the carrier device of FIG. 1.
Figure 3:
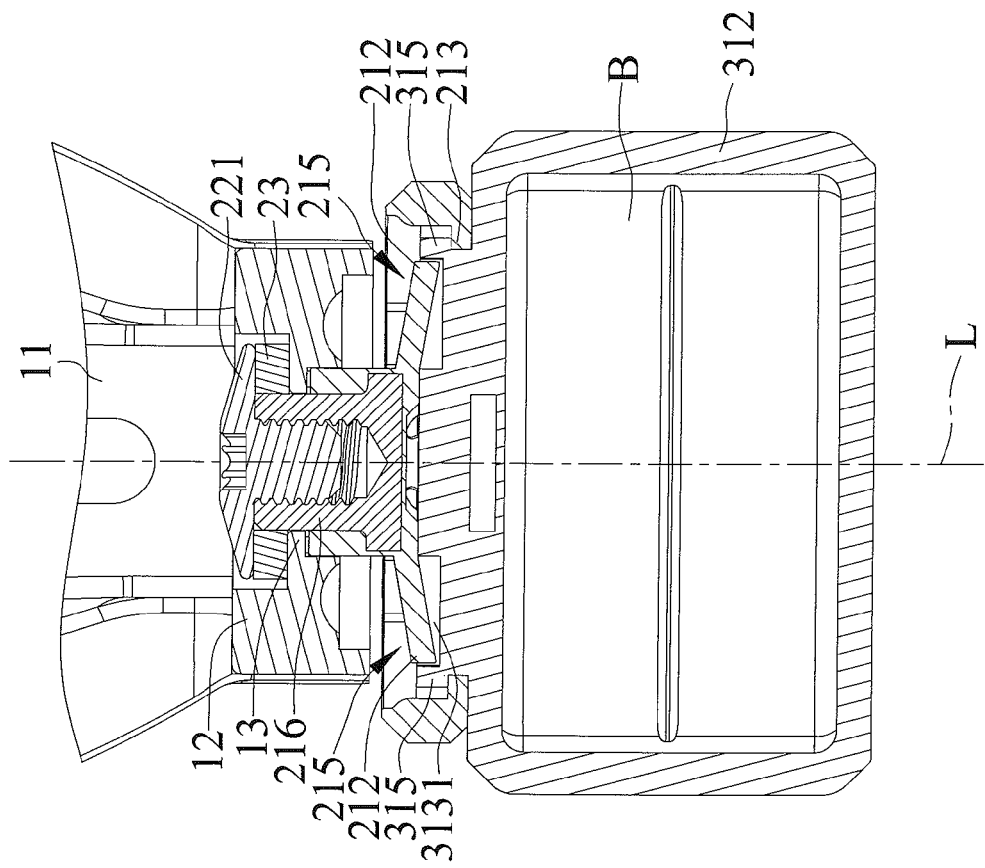
FIG. 3 is a partial, enlarged, cross sectional view of the carrier device of FIG. 1 with the carrier device in an engaged position.
Figure 4:
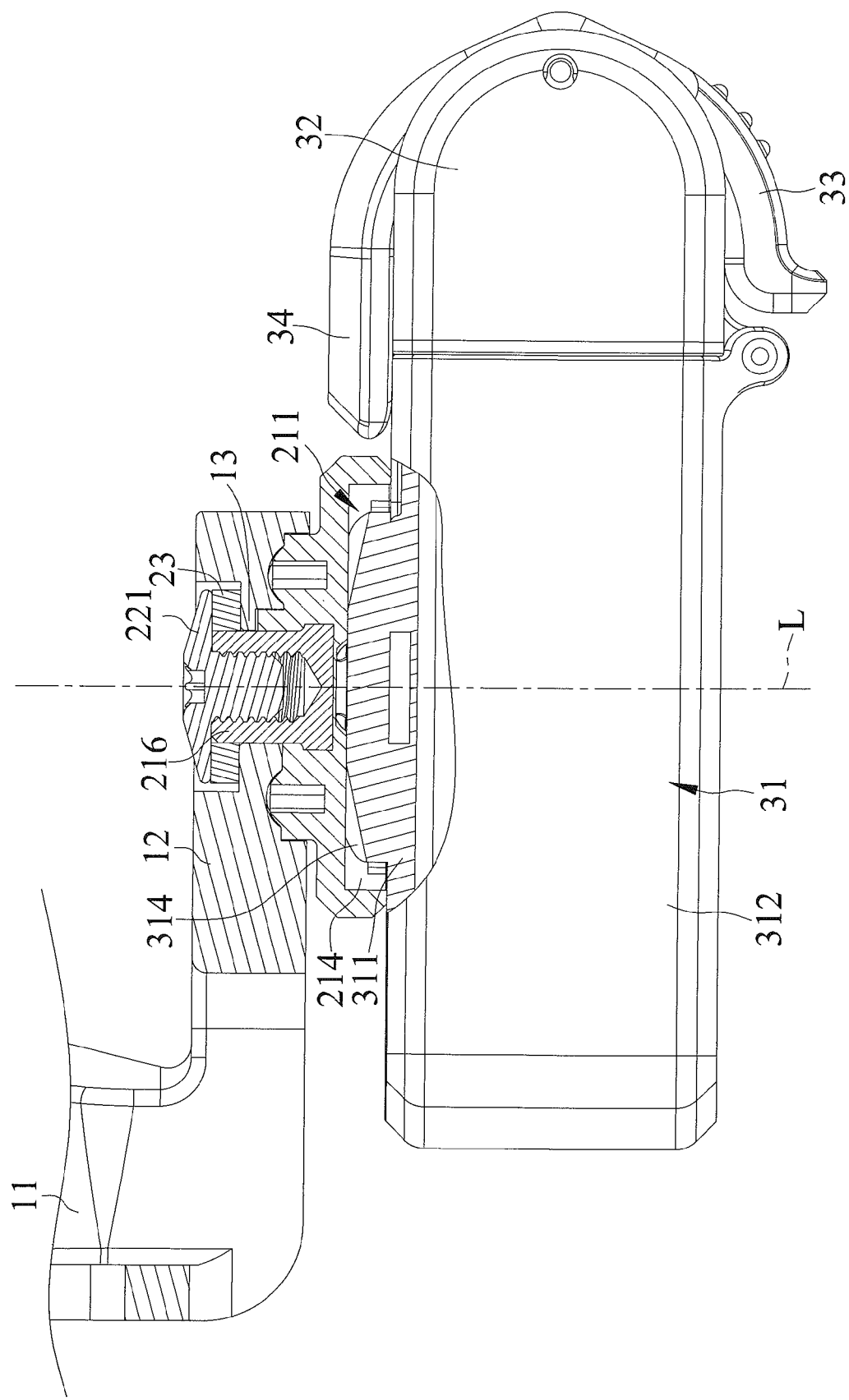
FIG. 4 is another partial, enlarged, partly cross-sectioned view of the carrier device of FIG. 1 with the carrier device in the engaged position.
Figure 5:
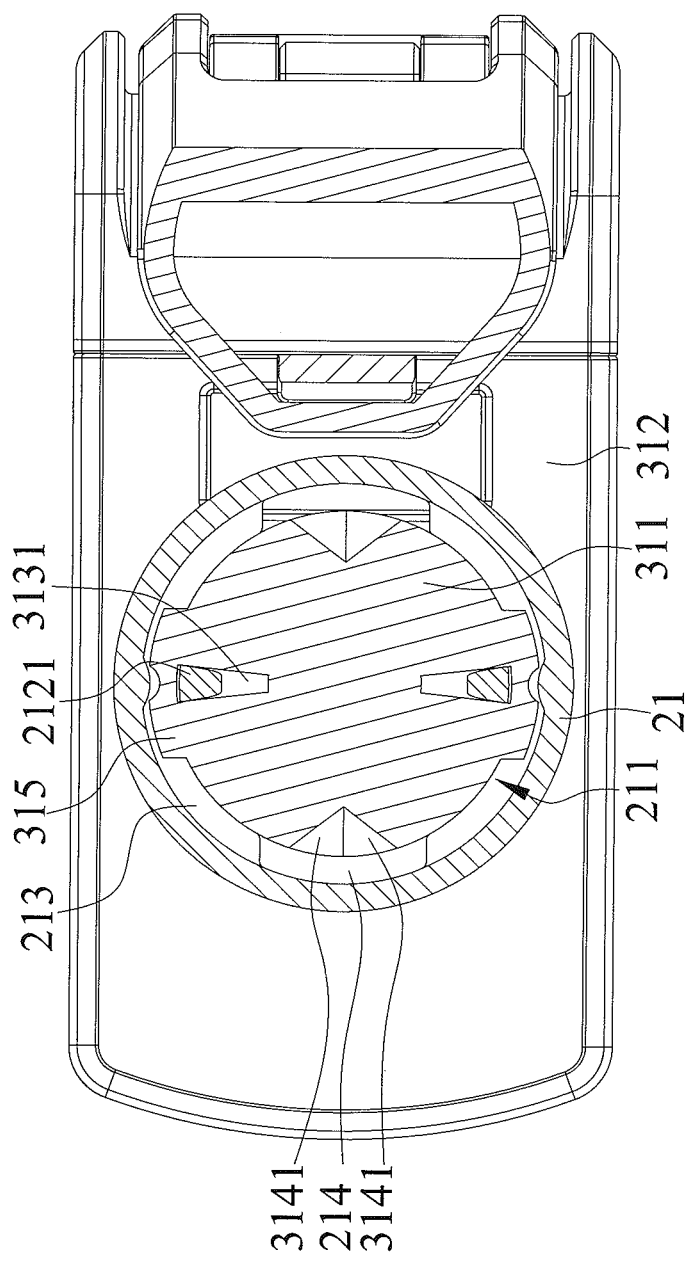
FIG. 5 is a further partial, enlarged, partly cross-sectioned view of the carrier device of FIG. 1 with the carrier device in the engaged position.

With reference to FIGS. 1-5, a carrier device for a bicycle of an embodiment according to the present invention includes a frame 10, a connecting unit 20, and an article receiving unit 30. The frame 10 can be connected to a bicycle and can receive a water bottle. The connecting unit 20 is connected to the frame 10. The article receiving unit 30 is detachably connected to the connecting unit 20 and can receive articles for the bicycle.

The frame 10 includes a first body portion 11, a second body portion 12, a shoulder 13, at least one first rib 14, at least one second rib 15, and an extension 16. The first body portion 11 is connected to the second body portion 12 and can be connected to the bicycle. The shoulder 13 is disposed on the second body portion 12. The at least one first rib 14 is interconnected between the first body portion 11 and the extension 16. The at least one second rib 15 is interconnected between the first body portion 11 and the extension 16. The first body portion 11, the second body portion 12, the at least one first rib 14, the at least one second rib 15, and the extension 16 together define a receiving space A adapted for receiving a water bottle. In this embodiment, the frame 10 includes two first ribs 14 and two second ribs 15.

The first body portion 11 includes at least one through-hole 111 extending therethrough. The at least one through-hole 111 is adapted to be aligned with a water bottle screw hole of the bicycle to permit the frame 10 to be coupled to the bicycle. The second body portion 12 includes a second through-hole 121 extending through two opposite ends of the second body portion 12 along a rotating axis L. The shoulder 13 is disposed on an inner periphery of the second through-hole 121.

The connecting unit 20 includes an engaging member 21, a connecting member 22, and a washer 23. The engaging member 21 is disposed on an end of the second body portion 12 remote to the first body portion 11. The connecting member 22 is received in the second through-hole 121 and is connected to the engaging member 21. The washer 23 is mounted between the shoulder 13 and the connecting member 22.

The engaging member 21 includes a receiving groove 211, at least one elastic portion 212, an abutting shoulder 213, at least one opening 214, at least one receptacle 215, and a connecting portion 216. The receiving groove 211 is defined in an end of the engaging member 21 remote to the second body portion 12. The at least one elastic portion 212 is elastically and flexibly disposed in a bottom wall of the receiving groove 211 and includes an engaging edge 2121. The abutting shoulder 213 is annularly disposed around a peripheral edge of an end of the receiving groove 211 opposite to the at least one elastic portion 212. The at least one opening 214 is disposed in the abutting shoulder 213 and is intercommunicated with the receiving groove 211. The at least one receptacle 215 is defined in the bottom wall of the receiving groove 211. The at least one elastic portion 212 is elastically and flexibly received in the at least one receptacle 215. The connecting portion 216 and the receiving groove 211 are located on two opposite ends of the engaging member 21. The connecting portion 216 is received in the second through-hole 121 and is connected to the connecting member 22. The connecting member 22 includes an abutting portion 221. The washer 23 is mounted between the shoulder 13 and the abutting portion 221.

In this embodiment, the engaging member 21 includes two elastic portions 212 extending toward two opposite sides of the receiving groove 211. Each engaging edge 2121 is in the form of a projection. Furthermore, the engaging member 21 includes two openings 214 disposed in the abutting shoulder 213 and located in two sides of the receiving groove 211 which are diametrically opposed relative to the rotating axis L. The two openings 214 are intercommunicated with the receiving groove 211. Furthermore, the engaging member 21 includes two receptacles 215 defined in the bottom wall of the receiving groove 211. The two elastic portions 212 are elastically and flexibly received in the two receptacles 215, respectively.

The article receiving unit 30 includes an accommodating member 31, a cover 32, a pulling member 33, and a coupling member 34. The accommodating member 31 is removably received in the receiving groove 211 and is rotatable relative to the receiving groove 211 about the rotating axis L. The cover 32 is pivotably connected to the accommodating member 31. The cover 32 and the accommodating member 31 together define an accommodation space B adapted to receive the articles for the bicycle. The pulling member 33 is pivotably connected to the cover 32. The coupling member 34 is pivotably connected to the pulling member 33. The coupling member 34 is releasably coupled with the accommodating member 31. The cover 32 is pivotable relative to the accommodating member 31 to open the accommodation space B.

The accommodating portion 31 includes a protruding portion 311, an accommodating portion 312, at least one first positioning portion 313, at least one second positioning portion 314, and at least one pressing portion 315. The protruding portion 311 and the accommodating portion 312 are disposed on two opposite ends of the accommodating member 31 along the rotating axis L. The protruding portion 311 is releasably received in the receiving groove 211. The cover 32 is pivotably connected to the accommodating portion 312. The cover 32 and the accommodating portion 312 together define the accommodation space B. The at least one first positioning portion 313 and the at least one second positioning portion 314 are disposed on the protruding portion 311. The engaging edge 2121 of the at least one elastic portion 212 selectively engaged with the at least one first positioning portion 313 or the at least one second positioning portion 314. The at least one pressing portion 315 is disposed on a side of the protruding portion 311 and is passable through the at least one opening 214 to a position between the abutting shoulder 213 and the bottom wall of the receiving groove 211.

In this embodiment, the accommodating member 31 includes two first positioning portions 313 and two second positioning portions 314. The two first positioning portions 313 and the two second positioning portions 314 are alternatingly arranged in a circumferential direction about the rotating axis L. Each of the two first positioning portion 313 is spaced from each of the two second positioning portion 314 by 90 degrees. The engaging edges 2121 of the two elastic portions 212 selectively position the two first positioning portions 313 or the two second positioning portions 314. The accommodating member 31 includes two pressing portions 315 disposed on a periphery of the protruding portion 311, diametrically disposed relative to the rotating axis L, and extending away from each other. The two pressing portions 315 are passable through the two openings 214, respectively.

The protruding portion 311 includes an end face 3111 located on an end of the protruding portion 311 remote to the accommodation portion 312. The two first positioning portions 313 and the two second positioning portions 314 are disposed on the end face 3111 of the protruding portion 311. The two pressing portions 315 are disposed on a peripheral edge of the protruding portion 311 adjacent to the end face 3111 of the protruding portion 311. Each of the two first positioning portions 313 includes a positioning groove 3131. Each of the two second positioning portions 314 is in the form of a groove and has two inclined faces 3141 interconnected to each other and spaced from each other by an angle.

Figure 6:
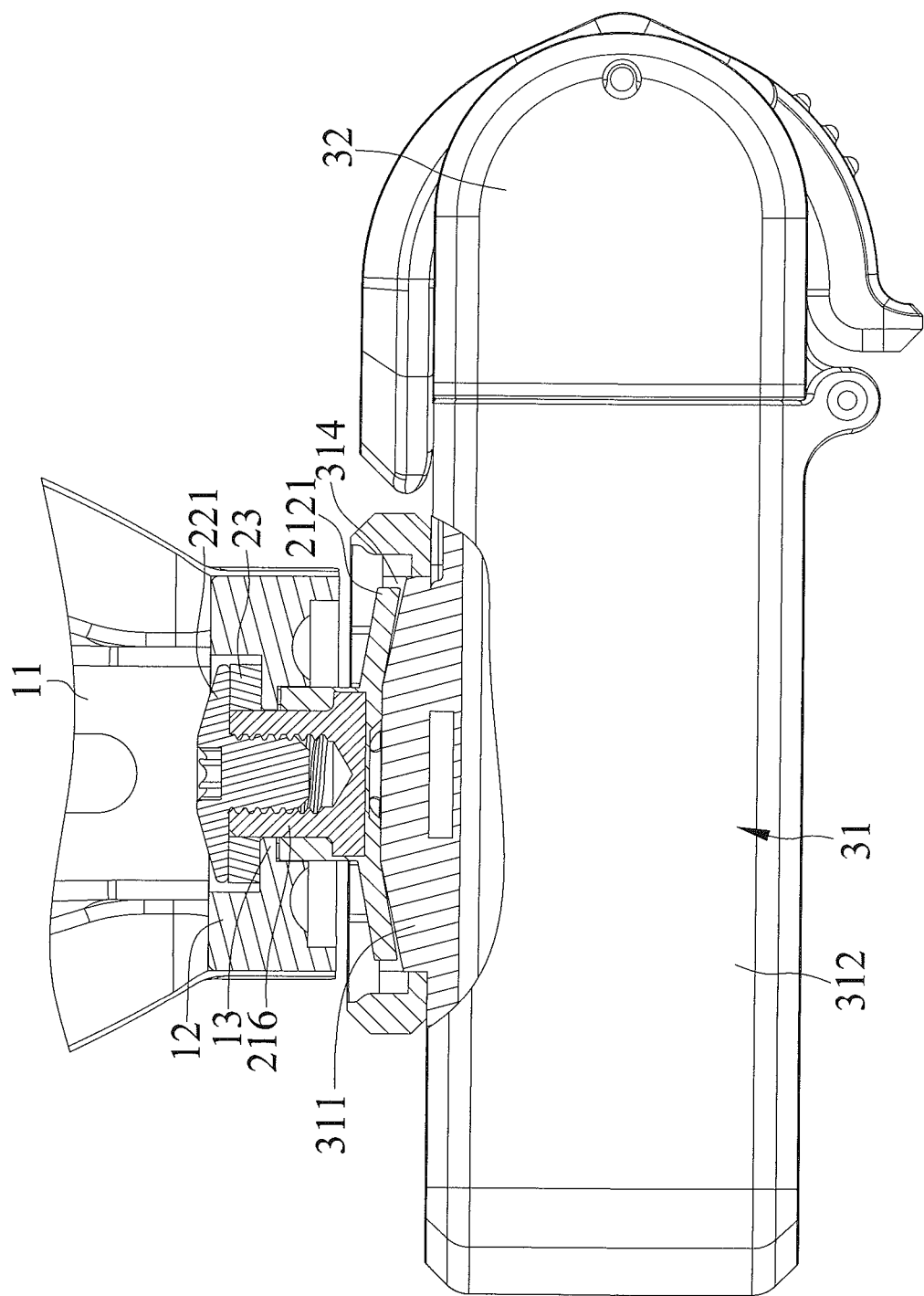
FIG. 6 is a view similar to FIG. 4 with the carrier device in a disengaged position.
Figure 7:
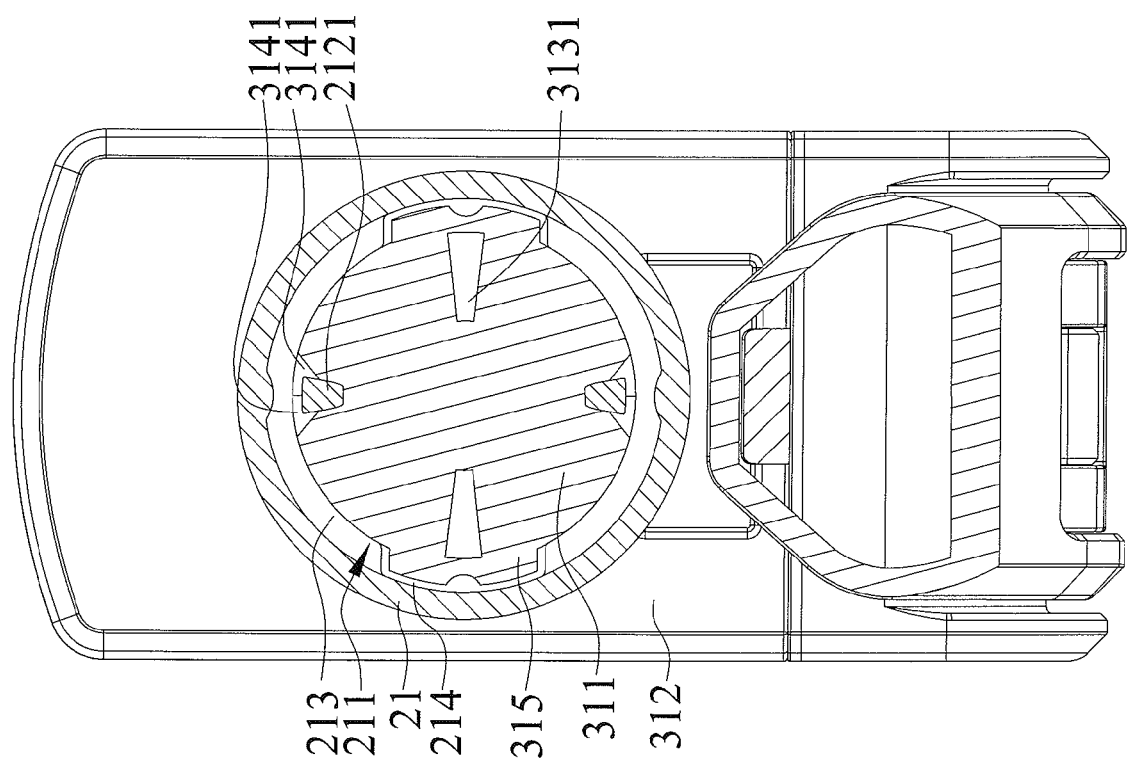
FIG. 7 is a view similar to FIG. 5 with the carrier device in the disengaged position.

With reference to FIGS. 2-8, the carrier device is switchable between an engaged position (FIGS. 3-5) and a disengaged position (FIGS. 6 and 7). When the carrier device is in the engaged position, the protruding portion 311 is received in the receiving groove 211, and the engaging edges 2121 of the two elastic portions 212 position the two first positioning portions 313 and extend into the positioning grooves 3131. Furthermore, each of the two pressing portions 315 is received in the receiving groove 211 and is located between the abutting shoulder 213 and the bottom wall of the receiving groove 211, avoiding detachment of the article receiving unit 30 from the connecting unit 20.

When the carrier device is switched to the disengaged position, the accommodating member 31 rotates relative to the receiving groove 211 about the rotating axis L. The engaging edges 2121 of the two elastic portions 212 disengage from the two first positioning portions 313. The two second positioning portions 314 respectively slide toward the two elastic portions 212. The two pressing portions 315 respectively slide along the abutting shoulder 213 toward the two openings 214.

Figure 8:
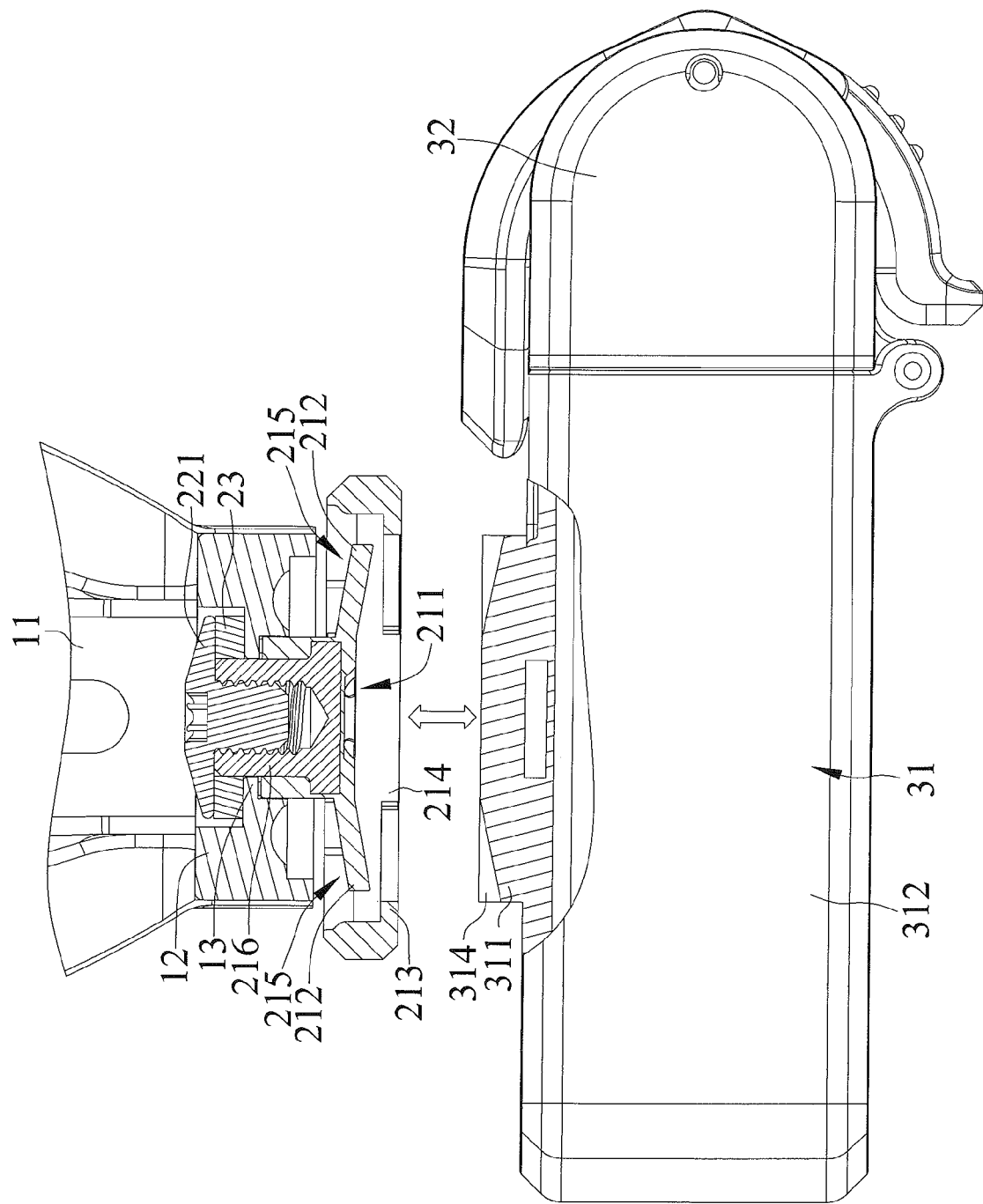
FIG. 8 is a view similar to FIG. 6 with an article receiving unit detached from a connecting unit.

When the carrier device reaches the disengaged position, the engaging edges 2121 of the two elastic portions 212 respectively position the two second positioning portions 314. The engaging edge 2121 of each of the two elastic portions 212 extends into between the two inclined faces 3141 of a corresponding one of the second positioning portions 314. The two pressing portions 315 respectively align with the two openings 214 and are movable out of the receiving groove 211. The protruding portion 311 is movable out of the receiving groove 211, permitting detachment of the article receiving unit 30 from the connecting unit 20 (FIG. 8).

Thus, when a user intends to retrieve the articles for the bicycle, the carrier device can be easily switched from the engaged position to the disengaged position to easily detach the article receiving unit 30 from the connecting unit 20. Then, the user can easily retrieve the articles received in the accommodating member 31.

Although specific embodiments have been illustrated and described, numerous modifications and variations are still possible without departing from the scope of the invention. The scope of the invention is limited by the accompanying claims.

The invention claimed is:

1. A carrier device for a bicycle, comprising:
a frame including a first body portion and a second body portion, with the first body portion connected to the second body portion and including at least one through-hole extending therethrough, with the at least one through-hole adapted to be aligned with a water bottle screw hole of a bicycle to permit the frame to be coupled to the bicycle;
a connecting unit connected to the second body portion and including an engaging member, with the engaging member including a receiving groove, at least one elastic portion, an abutting shoulder, and at least one opening, with the at least one elastic portion elastically and flexibly disposed in a bottom wall of the receiving groove and including an engaging edge, with the abutting shoulder disposed in an end of the receiving groove opposite to the at least one elastic portion, and with the at least one opening disposed in the abutting shoulder and intercommunicated with the receiving groove; and
an article receiving unit detachably connected to the connecting unit and including an accommodating member, with the accommodating member adapted to receive articles for the bicycle and including a protruding portion, at least one first positioning portion, at least one second positioning portion, and at least one pressing portion, with the protruding portion releasably received in the receiving groove, with the at least one first positioning portion and the at least one second positioning portion disposed on the protruding portion, with the engaging edge of the at least one elastic portion selectively engaged with the at least one first positioning portion or the at least one second positioning portion, with the at least one pressing portion disposed on a side of the protruding portion and passable through the at least one opening to a position between the abutting shoulder and the bottom wall of the receiving groove,
wherein the carrier device is switchable between an engaged position and a disengaged position, wherein when the carrier device is in the engaged position, the protruding portion is received in the receiving groove, the engaging edge of the at least one elastic portion positions the at least one first positioning portion, and the at least one pressing portion is received in the receiving groove and is located between the abutting shoulder and the bottom wall of the receiving groove, avoiding detachment of the article receiving unit from the connecting unit, and
wherein when the carrier device is in the disengaged position, the engaging edge of the at least one elastic portion positions the at least one second positioning portion, the at least one pressing portion aligns with the at least one opening and is movable out of the receiving groove, and the protruding portion is movable out of the receiving groove, permitting detachment of the article receiving unit from the connecting unit.

2. The carrier device for a bicycle as claimed in claim 1, with the accommodating member rotatable about a rotating axis relative to the receiving groove and including an accommodating portion adapted for receiving the articles for the bicycle, with the protruding portion and the accommodating portion disposed on two opposite ends of the accommodating member along the rotating axis, with the protruding portion including an end face located on an end of the protruding portion remote to the accommodation portion, with the at least one first positioning portion and the at least one second positioning portion disposed on the end face of the protruding portion, and with the at least one pressing portion disposed on a peripheral edge of the protruding portion adjacent to the end face of the protruding portion.

3. The carrier device for a bicycle as claimed in claim 2, with the abutting shoulder annularly disposed around the receiving groove, with the at least one opening including two openings disposed in the abutting shoulder and located in two sides of the receiving groove which are diametrically opposed relative to the rotating axis, with the two openings intercommunicated with the receiving groove, with the at least one pressing portion including two pressing portions, with the two pressing portions disposed on a periphery of the protruding portion, diametrically disposed relative to the rotating axis, and extending away from each other, and with the two pressing portions passable through the two openings, respectively.

4. The carrier device for a bicycle as claimed in claim 3, with the at least one elastic portion including two elastic portions extending toward two opposite sides of the receiving groove, with the at least one first positioning portion including two first positioning portions, with the at least one second positioning portion including two second positioning portions, with the two first positioning portions and the two second positioning portions alternatingly arranged in a circumferential direction about the rotating axis, with each of the two first positioning portion spaced from each of the two second positioning portion by 90 degrees, and with the engaging edges of the two elastic portions selectively position the two first positioning portions or the two second positioning portions.

5. The carrier device for a bicycle as claimed in claim 4, with each engaging edge being in a form of a projection, with each of the two first positioning portions including a positioning groove, with each of the two second positioning portions being in a form of a groove and having two inclined faces interconnected to each other and spaced from each other by an angle, wherein when the carrier device is in the engaged position, the engaging edges of the two elastic portions extend into the positioning grooves, wherein when the carrier device is in the disengaged position, the engaging edge of each of the two elastic portions extends into between the two inclined faces of one of the two second positioning portions.

6. The carrier device for a bicycle as claimed in claim 4, with the engaging member including two receptacles defined in the bottom wall of the receiving groove, and with the two elastic portions elastically and flexibly received in the two receptacles, respectively.

7. The carrier device for a bicycle as claimed in claim 1, with the second body portion including a second through-hole extending through two opposite ends of the second body portion, with the connecting unit including a connecting member received in the second through-hole, with the engaging member including a connecting portion 216, with the receiving groove and the connecting portion 216 respectively located on two opposite ends of the engaging member, and with the connecting portion 216 received in the second through-hole and connected to the connecting member.

8. The carrier device for a bicycle as claimed in claim 7, with the frame including a shoulder disposed on an inner periphery of the second through-hole, with the connecting member including an abutting portion, and with the connecting unit further including a washer mounted between the shoulder and the abutting portion.

9. The carrier device for a bicycle as claimed in claim 7, with the article receiving unit further including a cover, a pulling member, and a coupling member, with the cover pivotably connected to the accommodating member, with the cover and the accommodating member together defining an accommodation space, with the receiving space adapted to receive the articles for the bicycle, with the pulling member pivotably connected to the cover, with the coupling member pivotably connected to the pulling member, with the coupling member releasably coupled with the accommodating member, and with the cover pivotable relative to the accommodating member to open the accommodation space.

10. The carrier device for a bicycle as claimed in claim 7, with the frame including at least one first rib, at least one second rib, and an extension, with the at least one first rib interconnected between the first body portion and the extension, with the at least one second rib interconnected between the first body portion and the extension, and with the first body portion, the second body portion, the at least one first rib, the at least one second rib, and the extension together defining a receiving space adapted for receiving a water bottle.

\* \* \* \* \*